United States Patent [19]

Yasukawa, deceased et al.

[11] Patent Number: 4,872,293
[45] Date of Patent: Oct. 10, 1989

[54] ABRASIVE WATER JET CUTTING APPARATUS

[75] Inventors: Wataru Yasukawa, deceased, late of Kobe, by Shigeko Yasukawa, sole heiress; Masanori Kiyoshige, Akashi; Takeshi Horikawa; Tomonobu Okada, both of Kobe; Tadafumi Ochi, Amagasaki; Yoshiaki Aoki, Osaka; Masahiko Higashida; Takashi Kawashima, both of Akashi; Shigeki Koe, Kobe; Hideo Ono, Takasago; Kanta Nihei, Kobe; Syunji Takasugi, Kobe; Koji Take, Kobe, all of Japan

[73] Assignee: Kawasaki Jukogyo Kabushiki Kaisha, Hyogo, Japan

[21] Appl. No.: 17,345

[22] Filed: Feb. 20, 1987

[30] Foreign Application Priority Data

| Feb. 20, 1986 | [JP] | Japan | 61-36072 |
| Apr. 18, 1986 | [JP] | Japan | 61-90398 |
| Jul. 8, 1986 | [JP] | Japan | 61-161268 |
| Jul. 8, 1986 | [JP] | Japan | 61-161269 |
| Sep. 18, 1986 | [JP] | Japan | 61-143415[U] |
| Sep. 18, 1986 | [JP] | Japan | 61-143416[U] |
| Nov. 5, 1986 | [JP] | Japan | 61-264778 |

[51] Int. Cl.$^4$ ............................................. B24C 9/00
[52] U.S. Cl. ............................. 51/410; 51/424; 51/436; 51/439; 83/53; 83/177
[58] Field of Search ................ 51/410, 439, 436, 424, 51/425, 321; 83/53, 177

[56] References Cited

U.S. PATENT DOCUMENTS

| 2,801,133 | 7/1957 | Ridley | 51/439 |
| 2,985,050 | 5/1961 | Schwacha | 51/410 |
| 3,888,054 | 6/1975 | Maselli | 51/319 |
| 3,972,150 | 8/1976 | Hart | 51/428 |
| 4,112,797 | 2/1978 | Pearl | 83/177 |
| 4,319,435 | 3/1982 | Suzuki et al. | 51/436 |
| 4,478,368 | 10/1984 | Yie | 51/439 |
| 4,501,182 | 2/1985 | Jardat | 83/177 |
| 4,587,772 | 5/1986 | Griffiths | 51/439 |
| 4,648,215 | 3/1987 | Hashish | 51/439 |
| 4,656,791 | 4/1987 | Herrington | 51/410 |
| 4,669,229 | 6/1987 | Ehlbeck | 51/410 |
| 4,669,230 | 6/1987 | Suzuki et al. | 51/410 |
| 4,698,939 | 10/1987 | Hashish | 51/410 |

FOREIGN PATENT DOCUMENTS

| 119338 | 9/1984 | European Pat. Off. . | |
| 0192600 | 11/1907 | Fed. Rep. of Germany | 51/439 |
| 59-134664 | 8/1984 | Japan . | |

Primary Examiner—Frederick R. Schmidt
Assistant Examiner—Robert A. Rose
Attorney, Agent, or Firm—Wenderoth, Lind & Ponack

[57] ABSTRACT

For cutting sheet metal or other work by means of a jet of water containing abrasive particles, an abrasive water jet nozzle assembly is provided to which there are separately supplied highly pressurized water and an abrasive suspension. The abrasive suspension is such that abrasive particles with an average size of up to 100 microns are held in suspension in water. The abrasive suspension is introduced into the ejected water by virtue of a partial vacuum created in the nozzle assembly by the pressurized water. The nozzle assembly directs the resulting mixture as an abrasive water jet against the work for cutting thereof. Preferably, the abrasive water jet is recovered for recirculation back to the nozzle assembly as an abrasive suspension of controlled abrasive concentration. Various constructions of the nozzle assembly and various recovery systems are also disclosed.

3 Claims, 12 Drawing Sheets

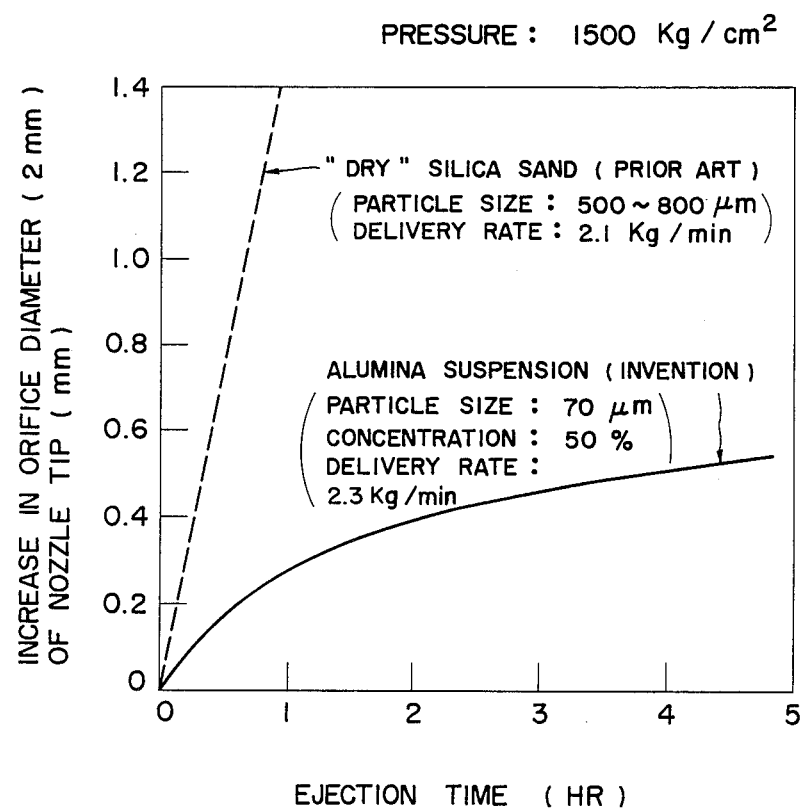
F I G. 3

CUT MADE BY PRIOR ART

CUT MADE BY INVENTION

CUT MADE BY PRIOR ART (BACK SIDE)

CUT MADE BY INVENTION (BACK SIDE)

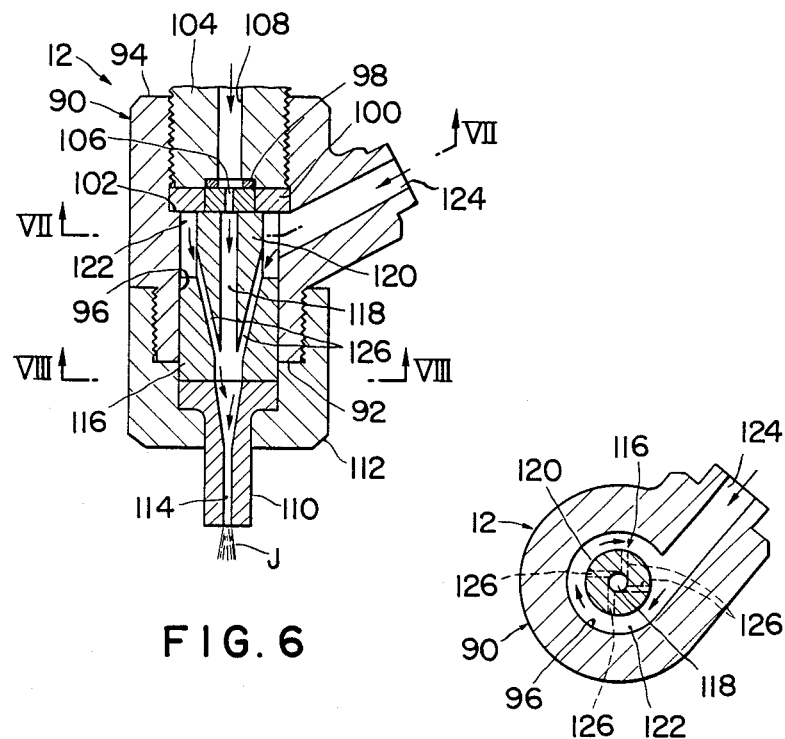
FIG. 6
FIG. 7
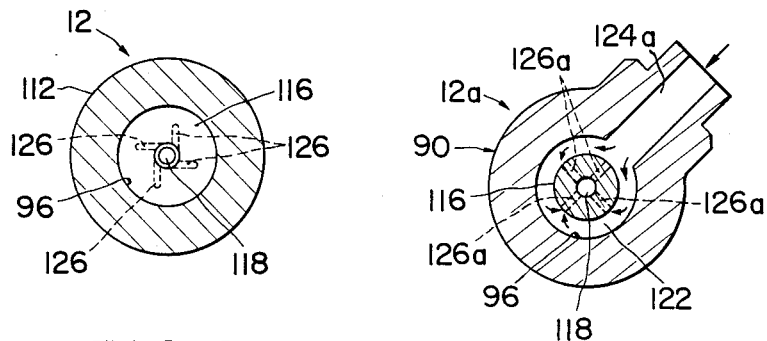
FIG. 8
FIG. 9

ABRASIVE WATER JET CUTTING APPARATUS

BACKGROUND OF THE INVENTION

This invention pertains to an apparatus for, cutting sheet metal or like work by means of a jet of highly pressurized water containing particles of an abrasive material. Such a jet of water containing abrasive particles is herein referred to as an abrasive water jet.

The cutting of metal or like materials by an abrasive water jet is per se not new but has been extensively practiced for some time now. As the abrasive particles there have been employed materials such as silica sand, cast iron grit, or powdered garnet or alumina. The average size of such abrasive particles has heretofore ranged from 0.2 to 0.8 millimeters.

The conventional abrasive water jet cutting practice has been such that highly pressurized water and "dry" abrasive particles are separately delivered to an abrasive water jet nozzle assembly. The abrasive particles merge into the stream of pressurized water within the nozzle assembly. The pressurized water containing the abrasive particles emerges from the nozzle assembly in the form of an abrasive water jet directed against the work. The abrasive water jet cuts the work as the nozzle assembly and work are moved relative to each other.

An objection to this conventional practice is that the abrasive particles are fed "dry" to the nozzle assembly and, in consequence, cannot possibly be reduced in size to such an extent as can be desired. Use of such coarse abrasive particles (from 0.2 to 0.8 millimeters in average size) is undesirable for more reasons than one. First, they give rise to the rapid wear of the nozzle tip and other parts of the nozzle assembly that are exposed to the abrasive particles. Second, the width of cut (kerf) created in the work is very large, usually larger than the orifice diameter of the nozzle tip. An additional problem is the production of burrs on the back of the work. consequently, the abrasive water jet cutting as heretofore practiced has required subsequent machining operations in applications where close tolerances and fine finish are of significance.

SUMMARY OF THE INVENTION

The present invention overcomes all the noted problems conventionally encountered in the art by making it possible to use abrasive particles of much smaller size than heretofore.

By use of the apparatus of the invention, it is possible to achieve an abrasive water jet cutting method wherein an abrasive water jet nozzle assembly is supplied with both highly pressurized water and an abrasive suspension. The abrasive suspension is such that abrasive particles with an average size of up to approximately 100 microns are held in suspension in water. The pressurized water and the abrasive suspension are mixed together in the nozzle assembly, and the resulting mixture is directed as an abrasive water jet against the work to be cut.

Fed into the nozzle assembly, the abrasive suspension can be introduced into the stream of the pressurized water by taking advantage of the partial vacuum created therein as the pressurized water flows therethrough at a high velocity.

The abrasive particles used by the invention may be of alumina, silicon carbide, or any such known or suitable abrasive material. Such abrasive particles can be far smaller in size than those employed heretofore because they are delivered to the nozzle assembly in the form of a suspension rather than in a "dry" state as in the prior art. Experiment has proved that the use of such fine abrasive particles results in a remarkable reduction of the wear of the nozzle assembly, particularly its nozzle tip, and therefore in a substantial extension of its useful life. Another advantage is a significant reduction of the kerf created in the work. Furthermore, since the water jet containing such fine abrasive particles not only cuts the work but also grinds the faces of the cut, it is possible to cut, for instance, a 5.3 millimeters thick stainless steel sheet without any burrs, as has been confirmed microscopically.

The maximum average size of the abrasive particles for use with the invention is set at 100 microns, because larger size particles would settle too quickly to be maintained in a state of suspension by any practical means of agitation. The concentration of the abrasive particles in the abrasive suspension may be anywhere between 20 and 70 percent by weight.

Stated in its simplest form, the apparatus of the invention comprises a source of water under pressure, means for supplying an abrasive suspension such that abrasive particles with an average size of up to about 100 microns are held in suspension in water, and an abrasive water jet nozzle assembly held opposite the work to be cut. Communicating with both the pressurized water source and the abrasive suspension supply means, the nozzle assembly functions to intermingle the pressurized water and the abrasive suspension and directs the resulting mixture as an abrasive water jet against the work.

The nozzle assembly can be of largely conventional design. However, the nozzle assembly as heretofore constructed and used for abrasive water jet cutting possesses the disadvantage that, as the pressurized water flows axially through the nozzle assembly, the "dry" abrasive particles are introduced into the pressurized water steam from only one lateral direction, resulting in an uneven dispersion of the abrasive particles in the pressurized water stream and, therefore, in the localized wear of some parts of the nozzle assembly. As an additional disadvantage, the water jet having the abrasive particles irregularly dispersed therein tends to produce irregular cuts.

The present invention eliminates the above stated weaknesses of the conventional abrasive water jet nozzle assembly. In the improved nozzle assembly hereby proposed, the abrasive suspension is introduced into the stream of pressurized water, flowing axially thorugh the nozzle assembly, through a plurality of abrasive suspension passageways disposed at constant angular spacings about the axis of the nozzle assembly. So introduced into the pressurized water stream, the abrasive particles are evenly dispersed therein to preclude the possibility of any localized wear of the nozzle tip and other pertinent parts of the nozzle assembly. The improved nozzle assembly also contributes materially to the production of precise cuts.

In another preferred form of abrasive water jet nozzle assembly hereby suggested, the nozzle assembly is comprised of a nonabrasive water nozzle subassembly and an abrasive water nozzle subassembly. The nonabrasive water nozzle subassembly communicates with the pressurized water source and has a nonabrasive water nozzle tip for expelling the pressurized water only. The abrasive water nozzle subassembly, on the other hand, communicates with the abrasive suspension supply means for admitting the abrasive suspension and mixing the same with the pressurized water expelled from the nonabrasive water nozzle tip of the nonabrasive water nozzle subassembly. The abrasive water nozzle subassembly has its own nozzle tip for directing the mixture of the pressurized water and abrasive suspension toward the work.

This alternative form of abrasive water jet nozzle assembly enables cutting either by an abrasive water jet or by a nonabrasive water jet (i.e. jet of water containing no abrasive particles) depending upon the work to be cut. The abrasive water nozzle subassembly may be coupled, as by mating screw threads, to the nonabrasive water nozzle subassembly to provide the abrasive water jet nozzle assembly for cutting by an abrasive water jet in accordance with the invention. For cutting by a jet of pressurized water only, the abrasive water nozzle subassembly may be unscrewed or otherwise detached from the nonabrasive water nozzle subassembly, the latter being then effective to produce the desired nonabrasive water jet. In addition to this advantage, the alternative nozzle assembly can be constructed to incorporate the feature set fourth in connection with the first described form of nozzle assembly.

Heretofore, as far as known, cutting by an abrasive or nonabrasive water jet has required the use of a different nozzle assembly designed exclusively for either purpose. The alternative nozzle assembly of this invention lends itself to both purposes. All that is required for adapting the nozzle assembly for one purpose or the other is to attach or detach the abrasive water nozzle subassembly to or from the nonabrasive water nozzle subassembly. The nonabrasive water nozzle subassembly can be left connected to the high pressure water conduit in both applications.

The alternative nozzle assembly gains an additional advantage. Preparatory to mounting the abrasive nozzle subassembly to the nonabrasive nozzle subassembly, water may be ejected from the nozzle tip of the latter at normal or lower pressure in order to determine if the jet of water is precisely aligned axially of the nozzle. If not, necessary readjustment may be effected before attaching the abrasive nozzle subassembly to the nonabrasive nozzle subassembly. Subsequently mounted to the nonabrasive nozzle subassemtly, the abrasive nozzle subassembly will suffer little or no uneven wear as the presurized water, admixed with the abrasive suspension in the abrasive nozzle subassembly, flows exactly axially thereof as a result of the above preliminary readjustment of the nonabrasive nozzle subassembly.

According to a further feature of the invention, the abrasive water jet which has issued from the nozzle assembly and has cut the work is directed into recovery vessel means. At least part of the recovered water and abrasive particles is then returned to the abrasive suspension supply means for the reuse of the abrasive particles.

It will be appreciated that such constant recirculation of the abrasive particles is possible because the abrasive particles are fed to the nozzle assembly in the form of a suspension in accordance with the invention. No such recirculation can be made if abrasive particles are fed "dry" to the nozzle assembly as in the prior art. As has been proved by experiment, the abrasive particles hardly change in size or shape after cutting operations, so that the performance of the cutting apparatus in not adversely affected in any way by the recirculation of the abrasive particles. Such recirculation is desirable not only because it eliminated the need for the disposal of the used particles but also a remarkable curtailment is realized in the operating costs of the apparatus.

A further feature of the invention resides in the construction of the recovery vessel means, which must be capable of withstanding the energy of the incoming abrasive water jet. Heretofore, for damping the energy of a water jet, either abrasive or nonabrasive, there have been employed glass wool or a plate of tungsten carbide or ceramic material immovably mounted in an open top vessel. The enegy of water jet for cutting metal work is such, however, that the fixed damping means usually become worn out after several hours of operation, thereby necessitating frequent replacement. Accordingly, the invention proposes the use of a multiplicity of rigid damper balls within a recovery vessel mounted opposite the abrasive water jet nozzle assembly. The recovery vessel has its inside surface at least partly rounded for recirculating the damper balls by the energy of the incoming abrasive water jet. Preferably, the damper balls are made of the same material as the abrasive particles.

Constantly recirculating within the recovery vessel, all the damper balls are successively exposed to the abrasive water jet for attenuating its energy and so gradually wear at the same rate. The recirculating damper balls can thus take up the force of the abrasive water jet for a much longer time than the conventional fixed damping means. Moreover, since a relatively small number of damper balls are required for continuous operation over an extended period of time, the over all size of the recovery vessel and any associated means can be made smaller than that of the prior art means.

The above and other features and advantages of this invention and the manner of realizing them will become more apparent, and the invention itself will best be understood, from a study of the following description and appended claims, with reference to the attached drawings showing some preferable embodiments of the invention.

BRIEF DESCRIPTION OF THE DRAWINGS

FIG. 3 is a graph plotting the curves of the wear (increase in orifice diameter) of the nozzle tips of abrasive water jet nozzle assemblies against the time of their operation, with the solid line curve representing the invention wherein abrasive particles are supplied in the form of a suspension, and the dashed curve representing the prior art arrangement wherein abrasive particles are supplied in a "dry"state;

FIG. 6 is an enlarged axial section through the abrasive water jet nozzle assembly used in the apparatus of FIGS. 1 and 2;

FIG. 7 is a cross section through the nozzle assembly of FIG. 6, taken along the line VII—VII therein;

FIG. 8 is also a cross section through the nozzle assembly of FIG. 6, taken along the line VIII—VIII therein;

FIG. 9 is a view similar to FIG. 7 but showing an alternative form of abrasive water jet nozzle assembly;

DETAILED DESCRIPTION

1. General Construction of Apparatus

The invention will now be described more specifically as adapted for the cutting of sheet metal. Typically, the abrasive water jet cutting apparatus in accordance with the invention may take the form of the arrangement of FIG. 1 or that of FIG. 2. These two different forms of apparatus will be described one after the other.

1-1. First Form of Apparatus

Figure 1:
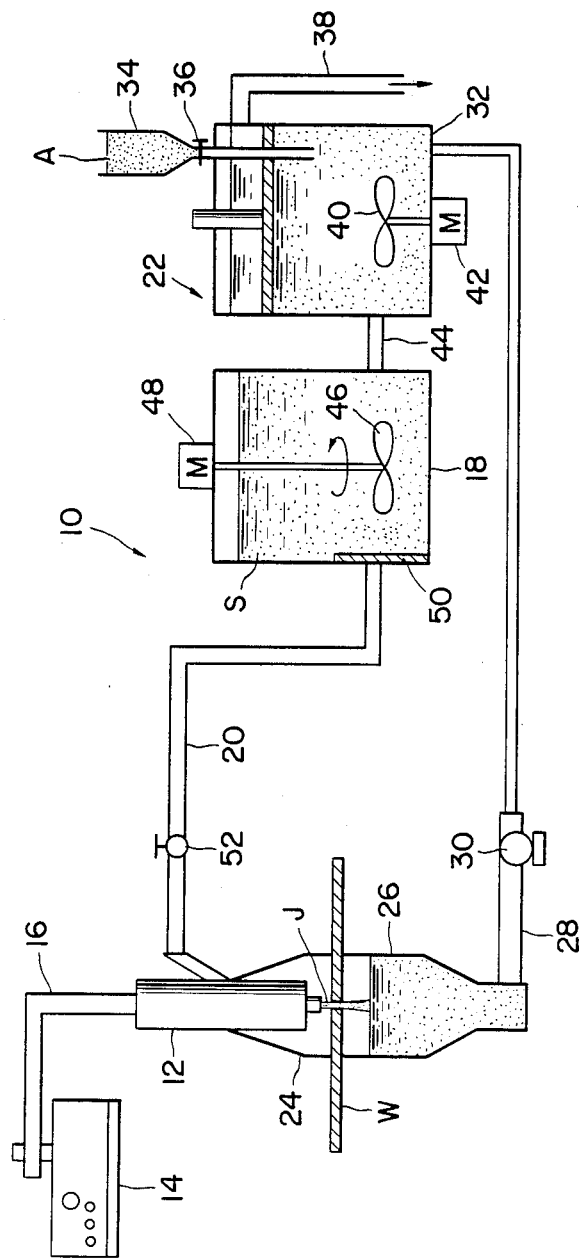
FIG. 1 is a diagrammatic illustration of the general organization of the abrasive water jet cutting apparatus incorporating the novel concepts of this invention.

Generally designated 10, the apparatus of FIG. 1 includes an abrasive water jet nozzle assembly 12 for expelling an abrasive water jet J against sheet metal work W to be cut. The nozzle assembly 12 communicates with an ultrahigh pressure water pump 14 by way of a conduit 16 on one hand and, on the other hand, with an agitation vessel 18 by way of a conduit 20. The agitation vessel 18 forms a part of abrasive suspension supply means 22 from which an abrasive suspension S (i.e. water containing abrasive particles in suspension) is supplied in accordance with the novel concepts of this invention.

The nozzle assembly 12 functions to introduce this abrasive suspension S into the stream of highly pressurized water from the pump 14 an to accelerate and direct the resulting fluid toward the work W as the abrasive water jet J for cutting the work. Several preferred constructions of the nozzle assembly 12 will be detailed subsequently. A splash guard 24 covers a lower part of the nozzle assembly 12 and extends down onto the surface of the work W.

Disposed opposite the nozzle assembly 12 across the work W is a recovery vessel means 26 for recovering the used abrasive particles by admitting the abrasive water jet J that has cut the work W. The recovery vessel means 26 is herein shown as a simple watertight vessel having an opening in its top for the admission of the abrasive water jet J. Although this construction is satisfactory for the recovery of the abrasive particles, several more refined constructions will be subsequently disclosed. A conduit 28 having a pump 30 communicates the recovery vessel means 26 with a concentration control vessel 32 for recirculating the recovered abrasive particles and water.

The concentration control vessel 32 constitutes in combination with the agitation vessel 18 the abrasive suspension supply means 22. A hopper 34 with a gate 36 is mounted atop the concentration control vessel 32 for metering abrasive particles A therein. An overflow conduit 38 maintains the water in the concentration control vessel 32 at a constant level. The concentration control vessel 32 is shown to be provided with set of agitator blades 40 driven by a motor 42. A conduit 44 communicates the concentration control vessel 32 with the agitation vessel 18.

The agitation vessel 18 is provided with its own agitator blades 46 driven by a motor 48 for stirring the abrasive suspension A and hence for holding the abrasive particles uniformly suspended throughout the body of water within the vessel 18. The agitation vessel 18 has an outlet opening, not shown, adjacent its bottom, which opening is provided with a filter 50 for the elimination of any unduly large abrasive particles or foreign matter. The conduit 20 communicates the outlet opening of the agitation vessel 18 with the abrasive water jet nozzle assembly 12 for conveying the abrasive suspension S from the former to the latter as by gravity. A flow control valve 52 may be provided on the conduit 20 for controlling the rate of delivery of the abrasive suspension A to the nozzle assembly 12.

Despite the showing of FIG. 1, however, the provision of the two separate vessels 18 and 32 is not of absolute necessity. Only one vessel might be employed and furnished with both an agitation and a hopper for providing the abrasive suspension S of desired abrasive concentration.

1-2. Second Form of Apparatus

Figure 2:
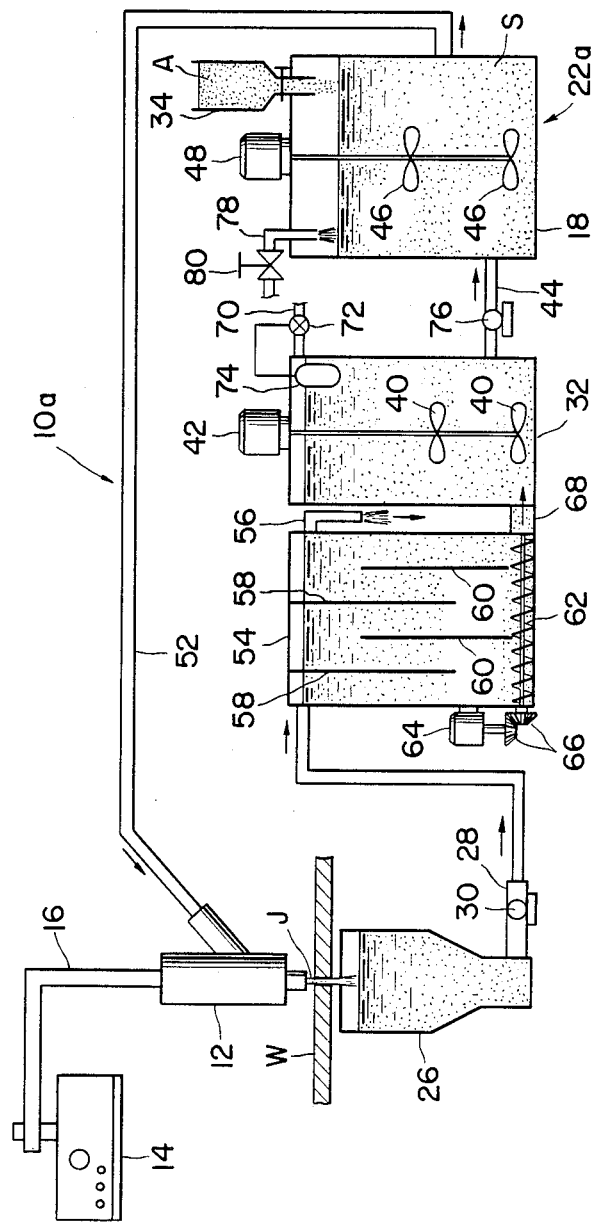
FIG. 2 is a similar illustration of an alternative form of the abrasive water jet cutting apparatus in accordance with the invention.

The alternative form of abrasive water jet cutting apparatus 10a shown in FIG. 2 differs from the FIG. 1 apparatus 10 mainly in its abrasive suspension supply means 22a. The modified abrasive suspension supply means 22a has a settling vessel 54 interposed between the recovery vessel means 26 and the concentration control vessel 32. The conduit 28 is coupled to an upper part of the settling vessel 54 for introducing the recovered abrasive particles and water therein. An overflow conduit 56 maintains constant the level of the fluid in the settling vessel 54.

Within the settling vessel 54 two or more baffle plates 58 extend downwardly from its top in parallel spaced relation to each other, whereas another two or more baffle plates 60 extend upwardly from its bottom in parallel spaced relation to each other. The two groups of baffle plates 58 an 60 are in staggered arrangement, defining a meandering path for the fluid pumped from the recovery vessel means 26. As the fluid flows along this meandering path, only those larger size ones of the recovered abrasive particles which are suitable for reuse will settle down to the bottom of the settling vessel 54. Smaller size particles which are not suitable for reuse (e.g. less than three microns in the case of alumina) will be discharged with part of the recovered water through the overflow conduit 56.

A screw pump 62 of conventional design is mounted on the bottom of the settling vessel 54 and rotatably extends through the baffle plates 60. Driven by a motor 64 via bevel gearing 66, the screw pump 62 operates to deliver the abrasive particles that have settled, to the concentration control vessel 32 via a conduit 68.

The concentration control vessel 32 of this alternative abrasive suspension supply means 22a differs from that of FIG. 1 in not being provided with an abrasive particle hopper but being provided with a water faucet 70 thereby to be fed with fresh water. The water faucet 70 has a solenoid actuated valve 72 which is electrically connected to a hydrometer 74. Measuring the specific gravity of the recovered abrasive suspension within the concentration control vessel 32, the hydrometer 74 makes on off control of the valve 72 in order to maintain the concentration of the abrasive suspension in the required range. Two sets of motor driven agitator blades 40 are provided within the concentration control vessel 32 substantially as in the FIG. 1 embodiment.

The agitation vessel 18 communicates with the concentration control vessel 32 by way of the conduit 44 which in this alternative embodiment is shown to be provided with a slurry pump 76. The agitation vessel 18 has agitator blades 46 driven by the motor 48 for agitating the abrasive suspension S. Also provided to the agitation vessel 18 are the hopper 34 for supplying fresh abrasive particles A, and a water faucet 78 having a cock 80.

Pumped into the agitation vessel 18 from the concentration control vessel 32, the abrasive suspension S is agitated by the agitator blades 46 so that the abrasive particles may be uniformly dispersed in the water. Since the abrasive concentration of the abrasive suspension S has already been controlled in the concentration control vessel 32, the fresh abrasive particles A and fresh water may be charged as required into the agitation vessel 18 at rates that have been predetermined in relation to each other.

As has been mentioned in connection with the abrasive suspension supply means, the concentration control vessel 32 and agitation vessel 18 could be combined into one. It is also possible to partition one vessel into a settling section and a concentration control section which intercommunicate through an opening in the partition.

The abrasive water jet cutting apparatus 10 of FIG. 1 and the alternative apparatus 10a of FIG. 2 are alike in operation except for the method of recirculation of the used abrasive particles. The particles A of abrasive material such as alumina or silicon carbide, with an average size of not more than 100 microns, may be metered into the concentration control vessel 32 in the FIG. 1 apparatus 10 or into the agitation vessel 18 in the FIG. 2 apparatus 10a, from the hopper 34. The abrasive particles A may be mixed with water in these vessels, and the mixture may be agitated, to provide the desired abrasive suspension S. The abrasive concentration of this abrasive suspension can be anywhere between about 20 and 70 percent by weight.

The maximum permissible average size of the abrasive particles is set at 100 microns because larger particles would settle too quickly to be held in suspension by the agitator blades 40 and 46. The abrasive concentration of the suspension should be in the range of 20 to 70 percent by weight because, should the concentration fall below 20 percent by weight, the resulting abrasive water jet would lose too much of its cutting capability. Should the abrasive concentration exceed 70 percent by weight, on the other hand, then the abrasive suspension would become too solid to be drawn into the abrasive water nozzle assembly 24 by the partial vaccum created therein by the flow of the ejected water therethrough.

With the preparation of the abrasive suspension S completed, the ultrahigh pressure pump 14 may be set into operation to deliver water under high pressure to the abrasive water jet nozzle assembly 12 by way of the conduit 16. The highly pressurized water will flow through the nozzle assembly 12 at such high velocity that the resulting negative pressure will draw the abrasive suspension S into the stream of ejected water.

As will be later referred to in connection with the detailed constructions of the nozzle assembly 12, the abrasive suspension on entering the nozzle assembly will whirl about its axis and so will be sufficiently agitated again immediately before merging into the stream of ejected water.

The rate of delivery of the abrasive suspension S to the nozzle assembly 12 may be controlled by the valve 52 for the utmost efficiency of cutting operation. For instance, if the orifice diameter of the nozzle assembly 12 is two millimeters, and if the abrasive concentration of the abrasive suspension S is 50 percent by weight, then the abrasive suspension may be supplied at a rate of five kilograms per minute. Should the abrasive suspension be supplied at more than this rate, the abrasive water jet J would diverge too much for effective cutting of the sheet metal work W.

The nozzle assembly 12 expels the mixture of the pressurized water from the source 14 and the abrasive suspension S from the supply means 22, in the form of the abrasive water jet J directed against the work W. The work can be cut as either the work or the combination of the nozzle assembly 24 and recovery vessel means 26 is moved relative to the other. The abrasive water jet J on cutting the work is recovered by the recovery vessel means 26 and is pumped therefrom back to the abrasive suspension supply means 22, either directly or via the settling vessel 54.

It has been confirmed that the abrasive particles, once used, hardly change in size or shape and are therefore reusable without any difficulties. The recirculation of the abrasive particles is desirable not only because it realizes economy in the use of the material but also because it makes easier than heretofore the disposal of the used material. A further advantage of the inventive method is the ease with which the abrasive suspension of the required concentration is prepared and fed to the nozzle assembly. Such a stable supply of abrasive particles to the nozzle assembly is essential to produce cuts of unvarying width.

Experiment has further proved that the supply of abrasive particles to the nozzle assembly 12 in the form of a suspension in accordance with the invention leads to materially less wear, and in consequence a much longer life, of the nozzle tip in comparison with the prior art. A study of FIG. 3 will make this advantage clear.

The solid line curve in the graph of FIG. 3 indicates the wear of the nozzle tip with the lapse of time when a suspension of alumina particles with an average size of 70 microns and a concentration of 50 percent by weight was supplied at a rate of 2.3 kilograms per minute in accordance with the invention. The dashed curve in the same graph indicates the wear of the nozzle tip with the lapse of time when silica sand with a size of 500 to 800 microns were supplied "dry" at a rate of 2.1 kilograms per minute in accordance with the prior art. The water pressure was 1500 kilograms per square centimeter in both cases. The useful life of the nozzle assembly, particularly of its tip, when used for metal cutting in accordance with the invention proved to be seven times as long as that of the nozzle assembly of the same construction used in accordance with the prior art.

Figure 4A:
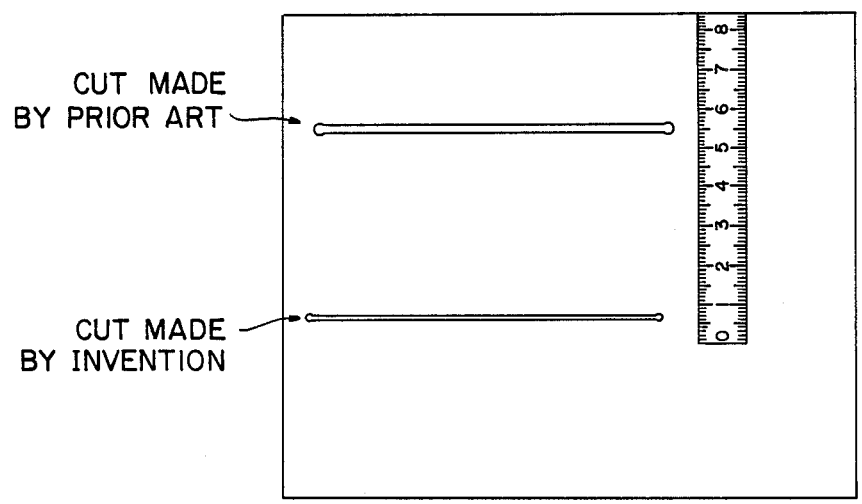
FIG. 4A is a photographic representation of cuts produced by the prior art arrangement and in accordance with the invention.
Figure 4B:
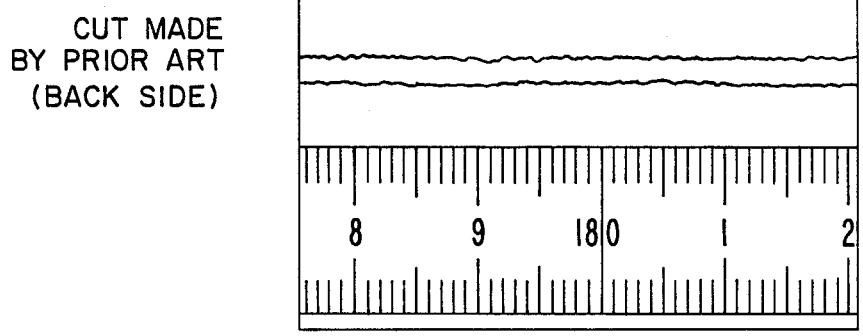
FIGS. 4B and 4C are enlarged photographic views showing the back side of the cuts in FIG. 4A, produced by prior art and by this invention.
Figure 4C:
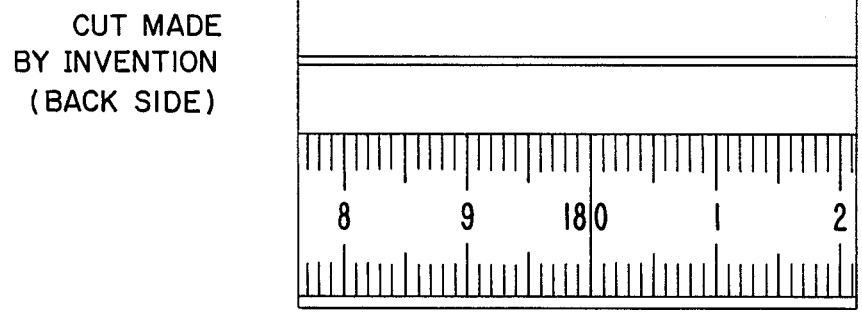

FIG. 4A is a photographic representation of a cut made in 1.0 millimeters thick stainless steel sheet in accordance with the invention, and of a cut made in the same work in accordance with the prior art ("dry" silica sand). Nozzle assemblies of the same tip orifice diameter were of course used for both cuts. It is evident that the kerf in accordance with the invention is far narrower than that in accordance with the prior art. Photographic views of FIGS. 4B and 4C indicate that burrs are present on the work cut in accordance with the prior art but not on the work cut in accordance with the invention.

Figure 5:
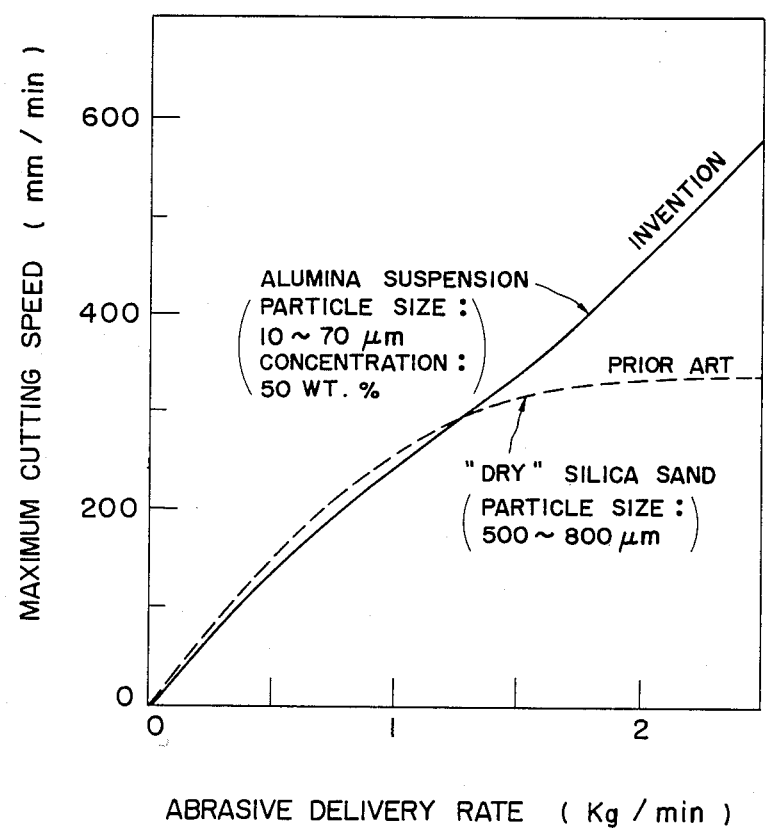
FIG. 5 is a graph plotting the curves of the maximum possible cutting speeds attainable against the rate of delivery of the abrasive particles, with the solid line curve representing the invention wherein the abrasive particles are supplied in the form of a suspension, and the dashed curve representing the prior art arrangement wherein the abrasive particles are supplied in a "dry" state.

FIG. 5 graphically demonstrates the relations between the rate of delivery of abrasive particles to the nozzle assembly and the maximum possible cutting speed. The solid line curve represents the inventive method wherein a suspension of alumina particles with an average size of 10 to 70 microns was used with an abrasive concentration of 50 percent by weight. The dashed curve represents the prior art method employing "dry" silica sand with an average size of 500 to 800 microns. Conventionally, the common belief has been that the larger the size of abrasive particles in use, the higher is the cutting capability of an abrasive water jet, at least with respect to metal or like ductile material. Contrary to this belief, the maximum possible cutting speed in accordance with the invention employing much finer abrasive particles than heretofore, is approximately equal to that according to the prior art at relatively low rates of abrasive delivery and becomes progressively higher at greater rates of abrasive delivery. Needless to say the jet pressures were the same for the two methods.

3. Abrasive Water Jet Nozzle Assembly

The abrasive water jet nozzle assembly heretofore used for introducing abrasive particles into a stream of ejected water has had one serious drawback. As the ejected water flows through an axial passageway in the conventional nozzle assembly, the abrasive particles travel through a radial path leading directly to the axial water passageway. So directed into the ejected water stream, the abrasive particles inevitably become unevenly dispersed therein and so cause localized wear of some parts of the nozzle assembly. Further, the water jet containing such unevenly dispersed abrasive particles tends to fail to produce exact cuts. The same inconveniences may manifest themselves if the abrasive particles are supplied in the form of a suspension in accordance with the invention. The following preferred constructions of the nozzle assembly realize an even dispersion of the abrasive particles in the ejected water stream.

3-1. First Form of Nozzle Assembly

The abrasive water jet nozzle assembly 12 is shown in its first preferred form in FIGS. 6 through 8. With reference first and in particular to FIG. 6, the nozzle assembly 12 has a generally cylindrical nozzle body 90 having a tip end 92 directed toward the work W, FIG. 1 or 2, and a base end 94 away from the work. An axial bore 96 extends through the nozzle body 90 between the tip end 92 and base end 94.

In the axial bore 96 of the nozzle body 90, and adjacent the base end 94 thereof, there is mounted a pressurized water nozzle tip 98 which is held by a nozzle tip holder 100 in coaxial relation to the nozzle body. The nozzle tip holder 100 is held against an annular shoulder 102 of the nozzle body 90 by an adapter 104 inserted in the axial bore 96 from the base end 94 of the nozzle body. The adapter 104 protrudes outwardly from the base end 94 of the nozzle body 90 for connection of the nozzle assembly 12 to the conduit 16, FIGS. 1 and 2, leading to the pump 14. An orifice 106 in the pressurized water nozzle tip 98 communicates with the pump 14 via a water passageway 108 in the adapter 104.

Mounted on the tip end 92 of the nozzle body 90 is an abrasive water nozzle tip 110 which is retained in position by a nozzle cap 112 threadedly engaged with the nozzle body. The abrasive water nozzle tip 110 has an orifice 114 in axial alignment with the orifice 106 in the pressurized water nozzle tip 98. The abrasive water jet J is to be expelled from this abrasive water nozzle tip 110.

An internal nozzle member 116 of generally cylindrical shape is mounted in the axial bore 96 in the nozzle body 90 and between the pressurized water nozzle tip 98 and the abrasive water nozzle tip 110. The internal nozzle member 116 has an ejected water passageway 118 extending axially therethrough. The passageway 118 is in alignment and direct communication with both the orifice 106 in the pressurized water nozzle tip 98 and the orifice 114 in the abrasive water nozzle tip 110.

It is thus seen that the pressurized water from the pump 14 flows through the rectilinear path comprising the passageway 108 in the adapter 104, the orifice 106 in the pressurized water nozzle tip 98, the passageway 118 in the internal nozzle member 116, and the orifice 114 in the abrasive water nozzle tip 110. The abrasive suspension is to be introduced into this stream of ejected water at the passageway 118 in the internal nozzle member 116, as will be explained in more detail hereafter.

As shown also in FIG. 7, the internal nozzle member 116 has a reduced diameter portion 120 to define, in combination with the nozzle body 90 and pressurized water nozzle tip holder 100, an abrasive suspension chamber 122 of annular or tubular shape concentrically surrounding the ejected water passageway 118 in the internal nozzle member 116. The nozzle body 90 has an abrasive suspension inlet port 124 leading to the abrasive suspension chamber 122 for the admission of the abrasive suspension S from its supply means 22 of FIG. 1 or the supply means 22a of FIG. 2.

Preferably, and as shown in FIG. 7, the abrasive suspension inlet port 124 extends tangentially of the abrasive suspension chamber 122 as seen in the axial direction of the nozzle assembly 12. Consequently, the abrasive suspension on entering the abrasive suspension chamber 122 from the inlet port 124 whirls therein as indicated by the arrows in FIG. 7. While so whirling through the chamber 122, the abrasive suspension is to be drawn into the pressurized water passageway 118 in the internal nozzle member 116 through a plurality of, four in this particular embodiment, abrasive suspension passageways 126 in the internal nozzle member.

FIGS. 7 and 8 indicate that the abrasive suspension passageways 126 are disposed at constant angular spacings about the pressurized water passageway 118 in the internal nozzle member 116. Further, preferably, the abrasive suspension passageways 126 extend tangentially of the pressurized water passageway 118, as viewed cross sectionally of the nozzle assembly 12 as in FIGS. 7 and 8. It will also be observed from FIG. 6 that each abrasive suspension passageway 126 has its entrance end disposed at the junction between the larger and smaller diameter portions of the internal nozzle member 116, and its exit end disposed adjacent the exit end of the pressurized water passageway 118. Each abrasive suspension passageway 126 is thus angled toward the top end 92 of the nozzle body 90 as it extends from the abrasive suspension chamber 122 toward the ejected water passageway 118. Therefore, each abrasive suspension passageway 126 extends at an acute angle to the ejected water passageway 118 as seen in the axial section of the nozzle assembly as in FIG. 6, and in a tangential direction of the ejected water passageway 118 as seen in the cross section of the nozzle assembly as in FIGS. 7 and 8.

Expelled from the pressurized water nozzle tip 98 under extremely high pressure, the water flows through the axial passageway 118 in the internal nozzle member 116 at such a high velocity that a sufficient vacuum develops to draw the abrasive suspension into the passageway 118 via the passageways 126 in the internal nozzle member. The abrasive suspension has been sufficiently agitated while whirling through the annular chamber 122, and has flown through the passageways 126 disposed at constant angular spacings about the nozzle axis, so that the abrasive particles will be uniformly dispersed in the stream of ejected water in the passageway 118.

Consequently, the abrasive water nozzle tip 110 will suffer little or no localized wear. As an additional advantage, containing the abrasive particles in uniform dispersion, the water jet J will cut the work with utmost precision.

3-2. Second Form of Nozzle Assembly

FIG. 9 shows a second preferred form of abrasive water jet nozzle assembly 12a, which in fact is a slight modification of the first described nozzle assembly 12 of FIGS. 6 through 8. The modified nozzle assembly 12a differs from the original nozzle assembly 12 in that the abrasive suspension inlet port 124a extends radially of the nozzle body 90, rather than tangentially of the abrasive suspension chamber 122. Another difference is that the abrasive suspension passageways 126a extend radially of the internal nozzle member 116, rather than tangentially of the pressurized water passageway 118. The other details of construction can be exactly as previously set forth in connection with the FIGS. 6 through 8 nozzle assembly 12.

An even dispersion of the abrasive particles in the stream of pressurized water can be realized even if the abrasive suspension inlet port 124a and abrasive suspension passageways 126a do not extend tangentially of the abrasive suspension chamber 96 and ejected water passageway 118, respectively, as in this nozzle assembly 12a. The modified nozzle assembly 12a is meant to illustrate the fact that a minimal requirement for the even dispersion of the abrasive particles in the stream of pressurized water is that the abrasive suspension passageways 126a be disposed at constant angular spacings about the ejected water passageway 118.

Both the nozzle assembly 12 of FIGS. 6 through 8 and the nozzle assembly 12a of FIG. 9 are subject to an additional modification within the scope of this invention. The abrasive suspension passageways 126 and 126a need not extend at acute angles to the ejected water passageway 118 as seen in the axial section of the nozzle assemblies as in FIGS. 6 and 9. The desired objective is attainable if the abrasive suspension passageways 126 or 126a are all contained in a cross sectional plane of the nozzle assembly 12 or 12a.

3-3. Third Form of Nozzle Assembly

Figure 10:
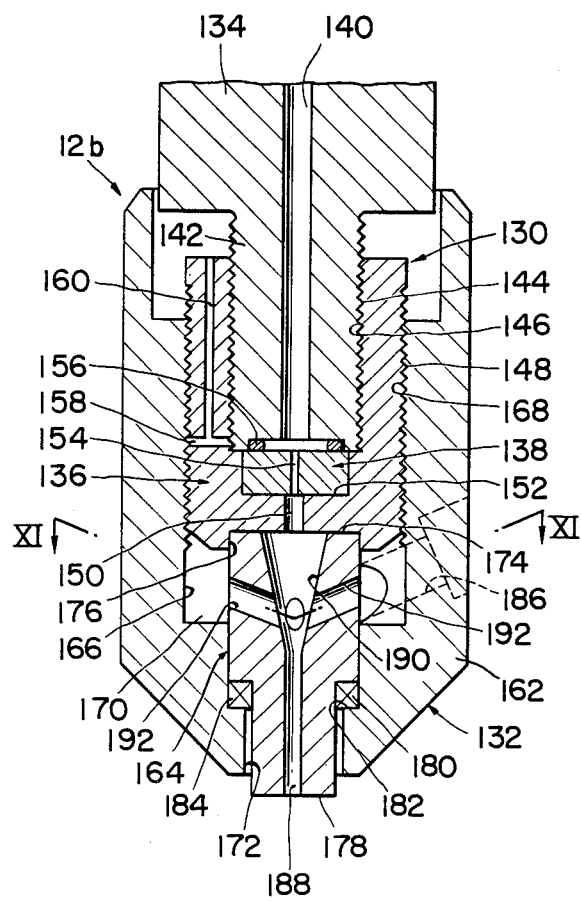
FIG. 10 is an axial section through a further preferred form of abrasive water jet nozzle assembly for use in the apparatus of FIGS. 1 and 2, the nozzle assembly comprising a nonabrasive water nozzle subassembly and an abrasive water nozzle subassembly which are shown coupled together for abrasive water jet cutting in the apparatus of FIGS. 1 and 2.
Figure 11:
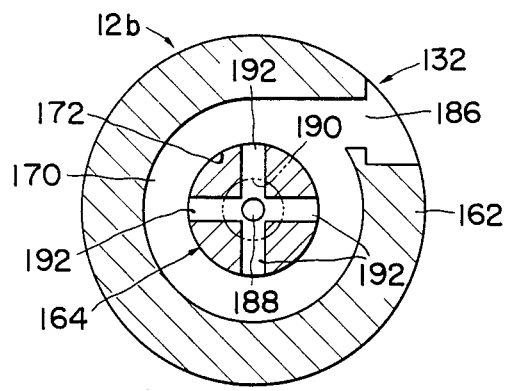
FIG. 11 is a cross section through the nozzle assembly of FIG. 10, taken along the line XI—XI therein.
Figure 12:
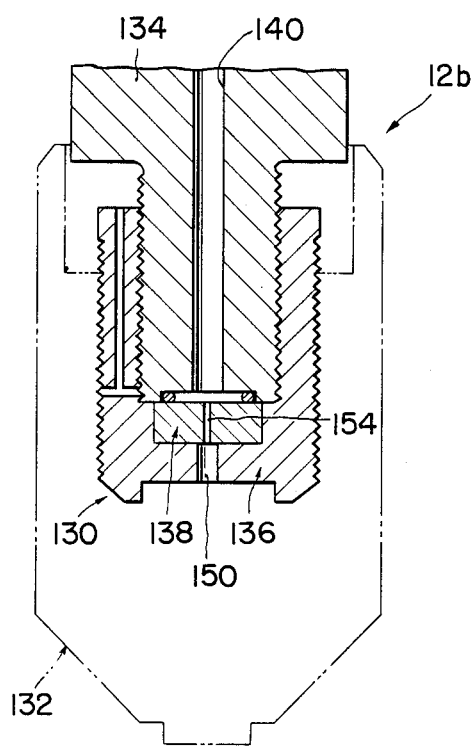
FIG. 12 is an axial section through the nonabrasive water nozzle subassembly of the nozzle assembly of FIG. 10. with the abrasive water nozzle subassembly (not shown here) removed for use of the nozzle assembly for cutting by a jet of pressurized water only.

The third preferred form of abrasive water jet nozzle assembly 12b shown in FIGS. 10 through 12 features ready adaptability for cutting by means of a jet of pressurized water only, in addition to cutting by the abrasive water jet in accordance with the invention. Of course, beside this feature, the dual purpose nozzle assembly 12b is, or can be, constructed to incorporate all the features set forth in conjunction with the FIGS. 6 through 8 nozzle assembly 12 or the FIG. 9 nozzle assembly 12a.

As will be seen from FIG. 10, the dual purpose nozzle assembly 12b comprises a nonabrasive water nozzle subassembly 130 and an abrasive water nozzle subassembly 132. The nonabrasive water nozzle subassembly 130 communicates with the pump 14 of FIGS. 1 and 2 whereas the abrasive water nozzle subassembly 132 communicates with the abrasive suspension supply means 22 of FIG. 1 or with the abrasive suspension supply means 22a of FIG. 2.

Normally, or for cutting with an abrasive water jet in accordance with the invention, the abrasive water nozzle subassembly 132 is coupled to the nonabrasive water nozzle subassembly 130 as in FIG. 10. The abrasive water jet subassembly 132 is readily detachable from the nonabrasive water jet subassembly 130, as in FIG. 12, for cutting with a jet of pressurized water only expelled by the nonabrasive water nozzle subassembly.

Given hereafter is a more detailed description of the nonabrasive water nozzle subassembly 130, followed by that of the abrasive water nozzle subassembly 132.

With reference to FIG. 10 the nonabrasive water nozzle subassembly 130 comprises a nozzle body 134, a nozzle cap 136, and a nozzle tip 138. Of stepped cylindrical shape, the nozzle body 134 has an ejected water passageway 140 extending axially therethrough. The nozzle body 134 is adapted for direct coupling to the conduit 16, FIGS. 1 and 2, for communicating the passageway 140 with the pump 14. The nozzle body 134 has a reduced diameter portion 142 having an external screw thread 144 cut thereon.

The nozzle cap 136 is in the form of a hollow cylinder, closed at one end, and has an internal screw thread 146 and an external screw thread 148. The nozzle cap 136 is removably fitted over the reduced diameter portion 142 of the nozzle body 134 by the engagement of its internal thread 146 with the thread 144 on the nozzle body. An ejected water passageway 150 extends axially through the nozzle cap 136 in alignment with the ejected water passageway 140 in the nozzle body 134.

The nozzle tip 138 is mounted between nozzle body 134 and nozzle cap 136 by being closely received in a recess 152 in the nozzle cap. An orifice 154 extends through the nozzle tip 138 in alignment and communication both with the ejected water passageway 140 in the nozzle body 134 and with the pressurized water passageway 150 in the nozzle cap 136. An O ring seal 156 is placed between nozzle body 134 and nozzle tip 138 for watertightly sealing the joint therebetween. For the discharge of the water that may nevertheless escape through the joint between nozzle body 134 and nozzle tip 138, a relief passageway is provided which comprises a first bore 158 extending radially of the nozzle cap 136, and a second bore 160 which extends through the nozzle cap parallel to its axis and which is open at both ends to the first bore 158 and to the top end, as seen in FIG. 10, of the nozzle cap.

The abrasive water nozzle subassembly 132 comprises a nozzle body 162 and a nozzle tip 164. Generally cylindrical in shape, the abrasive water nozzle body 162 has an axial bore 166 defined therein to fit over the nonabrasive water nozzle cap 136. An internal screw thread 168 of the abrasive water nozzle body 162 engages with the external screw thread 148 on the nonabrasive water nozzle cap 136, making it possible to readily detach the abrasive water nozzle subassembly 132 from the nonabrasive water nozzle subassembly 130. The nonabrasive water nozzle cap 136 is received in the axial bore 166 in the abrasive water nozzle body 162 to such an extent as to form an annular or tubular abrasive suspension chamber 170 around the abrasive water nozzle tip 164.

Also substantially cylindrical in shape, the abrasive water nozzle tip 164 extends through an axial bore 172 in the abrasive water nozzle body 162. The abrasive water nozzle tip 164 has a first or top end 174 closely engaged in a depression 176 in the nonabrasive water nozzle cap 136, and a second or bottom end 178 directed toward the work. A shoulder 180 of the abrasive water nozzle tip 164 is seated against an annular ledge 182 on the axial bore 172 in the abrasive water nozzle body 162 via a spacer 184, so that the abrasive water nozzle tip 164 is prevented from detachment from the abrasive water nozzle body 162 in the direction toward the work.

As the abrasive water nozzle tip 164 protrudes upwardly, as viewed in FIG. 10, from the axial bore 172 and is held against the nonabrasive water nozzle cap 136, the noted abrasive suspension chamber 170 is defined around the protruding part of the abrasive water nozzle tip.

Both FIGS. 10 and 11 indicate that the abrasive water nozzle body 162 has an abrasive suspension inlet port 186 for the admission of the abrasive suspension from its supply means 22 or 22a into the abrasive suspension chamber 170. As seen cross sectionally of the abrasive water nozzle body 162 as in FIG. 11, the abrasive suspension inlet port 186 extends tangentially of the abrasive suspension chamber 170. Despite the showing of FIG. 11, however, the abrasive suspension inlet port 186 may extend radially of the abrasive water nozzle body 162, as has been explained in reference to the abrasive water jet nozzle assembly 12a of FIG. 9.

As will be better understood from FIG. 10, the abrasive water nozzle tip 164 has an ejected water passageway or orifice 188 extending axially therethrough in concentric relation to the abrasive suspension chamber 170. The passageway 188 is open at its top end to the passageway 150 in the nozzle cap 136 of the nonabrasive water nozzle subassembly 130. The bottom end of the passageway 188 is open toward the work to be cut. The passageway 18 includes an upper portion 190 which tapers as its extends downwardly from the top end of the passageway 188 and which terminates approximately midway between the top and bottom ends of the passageway 188.

With reference to both FIGS. 10 and 11, the abrasive water nozzle tip 164 has further formed therein a plurality of, four in this embodiment, abrasive suspension passageways 192 extending radially at constant angular spacings, as seen cross sectionally as in FIG. 11. Further, as viewed in an axial section of the abrasive water nozzle tip 164 as in FIG. 10, each abrasive suspension passageway 192 is inclined downwardly of the nozzle tip as it extends radially inwardly. The angle of each abrasive suspension passageway 192 with respect to a radial plane of the abrasive water nozzle tip 164 may be approximately 25 degrees. The abrasive suspension passageways 192 are open at their radially outer ends to the abrasive suspension chamber 170 and at their radially inner ends to the tapering upper portion 190 of the ejected water passageway 188 in the abrasive water nozzle tip 164.

All that is necessary for the use of this dual purpose nozzle assembly 12b for cutting by a jet of pressurized water only is the removal of the abrasive water nozzle subassembly 132 from the nonabrasive water nozzle subassembly 130. This can be easily done by unscrewing the nozzle body 162 of the abrasive water nozzle subassembly 132 from the nozzle cap 136 of the nonabrasive water nozzle subassembly 130.

FIG. 12 shown only the nonabrasive water nozzle subassembly 130 after the removal of the abrasive water nozzle subassembly 132 therefrom. Fed from the pump 14 of FIG. 1 or 2, the highly pressurized water will be ejected from the orifice 154 in the nozzle tip 138 of the nonabrasive water nozzle subassembly 130 via the greater diameter passageway 150 in the nozzle cap 136 against the work to be cut. The abrasive water nozzle subassembly 132 may be screwed onto the nonabrasive water nozzle subassembly 130, as shown in FIG. 10, for cutting by a jet of abrasive water in accordance with the teachings of FIGS. 1 and 2.

It is recommended that, before mounting the abrasive water nozzle subassembly 132 to the nonabrasive water nozzle subassembly 130, either in use or at the time of assemblage, pressurized water may be ejected from the nonabrasive water nozzle subassembly to make sure of the alignment of the resulting jet in the axial direction of the subassembly 130. The pressurized water used for this alignment of the jet may be supplied either from the high pressure pump 14 or from some lower pressure pump, not shown, whereever such a pump is available. The use of the latter pump is preferable for the safety of the operator.

If the water jet is found misaligned, necessary readjustment may be made as by retightening the nozzle cap 136. Then the abrasive water nozzle subassembly 132 may be mounted to the nonabrasive water nozzle subassembly 130. In the subsequent use of this dual purpose nozzle assembly 12b the jet of highly pressurized water from the nonabrasive water nozzle tip 138 will travel exactly axially through the passageways 150 and 188 in the nonabrasive water nozzle cap 136 and abrasive water nozzle tip 188. These parts will therefore suffer no uneven wear. The abrasive suspension fed either from the supply means 22 of FIG. 1 or from the alternative supply means 22a of FIG. 2 will be evenly introduced into the stream of high velocity water in the tapering portion 190 of the passageway 188 in the abrasive water nozzle tip 164 in the manner already explained in conjunction with the nozzle assembly 12 of FIGS. 6 through 8 and the nozzle assembly 12a of FIG. 9.

Although an abrasive water jet is certainly required for cutting workpieces of certain sizes, shapes or materials, a nonabrasive water jet suffices for cutting other types of work. There have, however, been available nozzle assemblies devoted exclusively to either abrasive or nonabrasive water jet cutting. For a change from one cutting mode to the other, the nozzle assembly that has been in use has had to be disconnected from the conduit leading to the high pressure pump, and another type of nozzle assembly has had to be coupled to the same conduit.

In contrast, the construction of the dual purpose nozzle assembly 12b in accordance with the invention is such that all that is required for a change between the two cutting modes is to either screw or unscrew the abrasive water nozzle subassembly 132 onto or from the nonabrasive water nozzle subassembly 130. As a further advantage, once coupled to the conduit leading to the high pressure pump 14, the nonabrasive water nozzle subassembly 130 need not be disconnected therefrom except for maintenance purposes or other rare occasions. The high pressure water conduit can thus be precluded from quick impairment as a result of repeated connection to, and disconnection from, the nozzle assembly.

As will be understood, the threaded connection of the nonabrasive and abrasive water nozzle subassemblies 130 and 132 of this dual purpose nozzle assembly 12b is not an absolute requirement. Other means may be employed for this purpose, provided that the abrasive water nozzle subassembly 132 is readily removable from the nonabrasive water nozzle subassembly 130 but, once mounted to the latter, remains firmly engaged therewith.

An advantage common to all the foregoing disclosed nozzle assemblies 12, 12a and 12b is that, as the abrasive particles are fed in the form of a suspension in accordance with the invention, the nozzle assemblies need to provide a shorter distance of acceleration for the resulting stream of abrasive water than if the abrasive particles are conventionally supplied in a "dry" state. The nozzle assemblies can therefore be more compact in size, and require a smaller number of component parts, than heretofore. The shorter distance of acceleration provides the additional advantage of less attenuation of the fluid energy within the nozzle assembly, contributing to the greater cutting capability of the abrasive water jet under a given delivery pressure of the water pump 14.

4. Recovery Vessel Means

As has been herein said, the conventional fixed damping means such as glass wool and plates of tungsten carbide or ceramics for bearing the energy of the abrasive water jet are objectionable because of their rapid wear and the consequent need for frequent replacement. Such damping means have had to be laid out all along the path of the nozzle assembly and all over an area much greater than the portion to be struck by the water jet. Inevitably, therefore, the conventional damping means suffer rapid localized wear and so require frequent replacement. It might be contemplated to increase the thickness of such damping means, or to place such damping means within an open top vessel filled with water, in order to extend their useful life. These solutions are unsatisfactory by reason of the inevitable increase in the bulk of the complete recovery means. Such bulky means are especially unsuitable for use in robotized or automated cutting apparatus such that the abrasive water jet nozzle assembly and the recovery means are both transported relative to the work along a prescribed cutting line. Particularly when a water containing vessel is employed, the abrasive water jet must be oriented perpendicular to the surface of the water; in other words, the abrasive water jet nozzle assembly is capable of use only in a downward attitude. This limitation significantly lessens the versatility of the cutting apparatus.

The invention hereby proposes several improved constructions of recovery vessel means which are all free from the above discussed inconveniences of the known fixed damping means.

4-1. First Form of Recovery Vessel Means

Figure 13:
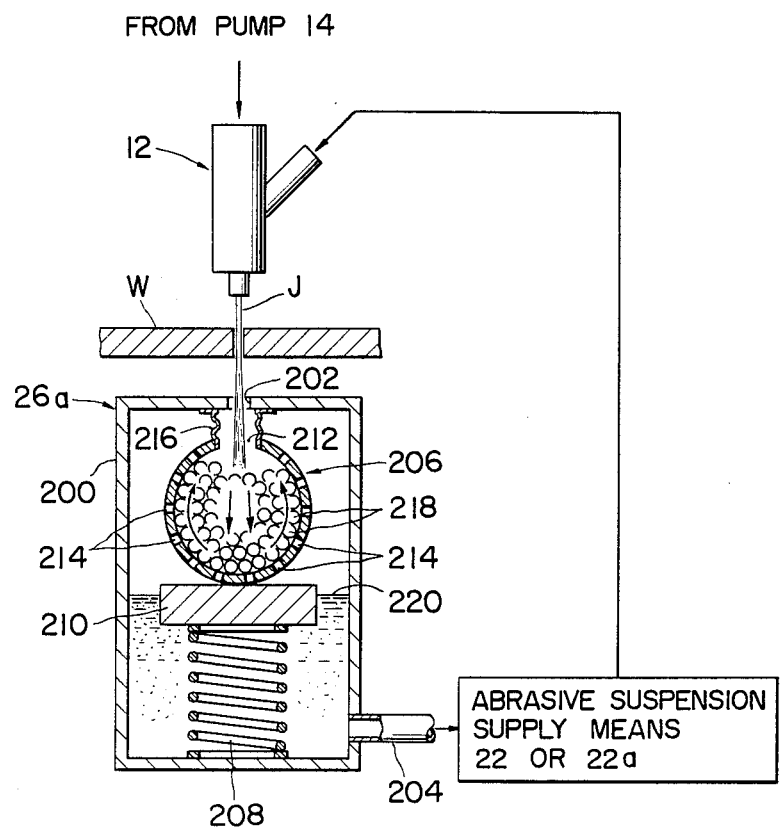
FIG. 13 is a vertical section through a preferred form of recovery vessel means suitable for use in the apparatus of FIGS. 1 and 2, the view including a diagrammatic representation of the other parts of the apparatus including the nozzle assembly in the act of cutting sheet metal work with the abrasive water jet being recovered, by way of illustration of the operation of the recovery vessel means.

As illustrated in FIG. 13, the first form of recovery vessel means 26a includes a watertight, boxlike enclosure 200 having an inlet opening 202 and an outlet opening 204. The inlet opening 202 is formed in the top of the enclosure 200 to admit the abrasive water jet J which has issued from the abrasive nozzle assembly 12, 12a or 12b and which has cut the work W. Positioned adjacent the bottom of the enclosure 200, the outlet opening 204 communicates with the abrasive suspension supply means 22, FIG. 1 or 22a, FIG. 2.

Within the enclosure 200 a recovery vessel 206 is resiliently supported on a relatively heavy helical compression spring 208 via a mount 210 of tungsten carbide or like material. The recovery vessel 206 is herein shown to be spherical in shape, having an inlet opening 212 for admitting the abrasive water jet. A multiplicity of outlet openings 214 are formed all over the recovery vessel 206 for the discharge of the admitted water and abrasive particles. A bellows 216 extends between, and intercommunicates, the inlet opening 202 in the enclosure 200 and the inlet opening 212 in the recovery vessel 206 in order to allow the resilient displacement of the recovery vessel relative to the enclosure.

A multiplicity of damper balls 218 are contained in the recovery vessel 206. Preferably, the damper balls 216 are made of the same material (e.g. ceramics) as the abrasive particles contained in the abrasive water jet J, although steel or like rigid, wear resistant materials may be employed.

The recovery vessel means 26a functions as follows to damp the energy of the incoming abrasive water jet J. On entering the recovery vessel 206 via the inlet 202 in the enclosure 200 and the bellows 216, the abrasive water jet will force some of the damper balls 218 against the bottom part of the spherical inside surface of the recovery vessel, as indicated by the arrows in FIG. 13. Also as indicated by the arrows in this figure, such downward thrust of some damper balls will cause the other damper balls to travel up the rounded inside surface of the recovery vessel 206, to reach just under the recovery vessel inlet 212, and to be thrusted down in turn by the incoming abrasive water jet. Due to such recirculation within the recovery vessel 206, each of the damper balls 218 will revolve about its own axis.

Consequently, the energy of the abrasive water jet J will be transformed into the energy of the recirculation and revolution of the damper balls 218. This motional energy of the damper balls will be dissipated as the heat produced as a result of friction among the damper balls and between the damper balls and the recovery vessel 206. Such effective dissipation of the jet energy lessens the impact of the abrasive water jet on the damper balls directly exposed thereto. The damper balls within the recovery vessel 206 will thus wear very slowly and, what is more important, all at the same rate. The useful life of the recirculating damper balls is much longer than that of the conventional fixed damping means.

It should further be appreciated that the recovery vessel 206 is mounted on the compression spring 208 in this embodiment. So supported, the recovery vessel 206 will be resiliently displaced not only up and down but also sideways as the abrasive water jet J falls on the damper balls 218 therein, only to such extents as are permitted by the bellows 216. The energy of the abrasive water jet J will thus be attenuated not only by the recirculating damper balls 218 but also by the spring 208. It is therefore apparent that, for this reason, too, the recovery vessel means 26a possess a much longer service life than the prior art fixed damping means.

After falling on the damper balls 218, the water containing the abrasive particles will flow out the outlet openings 214 in the recovery vessel 206 and will collect on the bottom of the enclosure 200, as indicated at 220. This recovered fluid 220 is to be fed as required to the abrasive suspension supply means 22 or 22a by the pump 30 shown in FIGS. 1 and 2.

It is also among the advantages gained by the recovery vessel means 26a that, being successively subjected to the force of the abrasive water jet J, a relatively small number of damper balls are required for use over an extended time. As the recovery vessel 206 can thus be of small size, so is the complete recovery vessel means 26a.

An additional advantage manifests itself when the damper balls 218 are made of the same material as the abrasive particles in use for cutting. The damper balls of such abrasive material will themselves produce abrasive particles as the abrasive water jet J falls thereon or as the damper balls strike one another. Such abrasive particles need not be separated from the recovered fluid 220 but can be allowed to flow with the recovered fluid through the abrasive particle supply means 22 or 22a without in any way deteriorating the cutting ability of the abrasive water jet J.

The damper balls 218 when worn out need replacement. The replacement of the worn damper balls will be easy, so small being the size of the recovery vessel 206. The recovery vessel 206 may be taken out of the enclosure 200, turned upside down for unloading the used damper balls, and reloaded with new damper balls.

4-2. Second Form of Recovery Vessel Means

Figure 14:
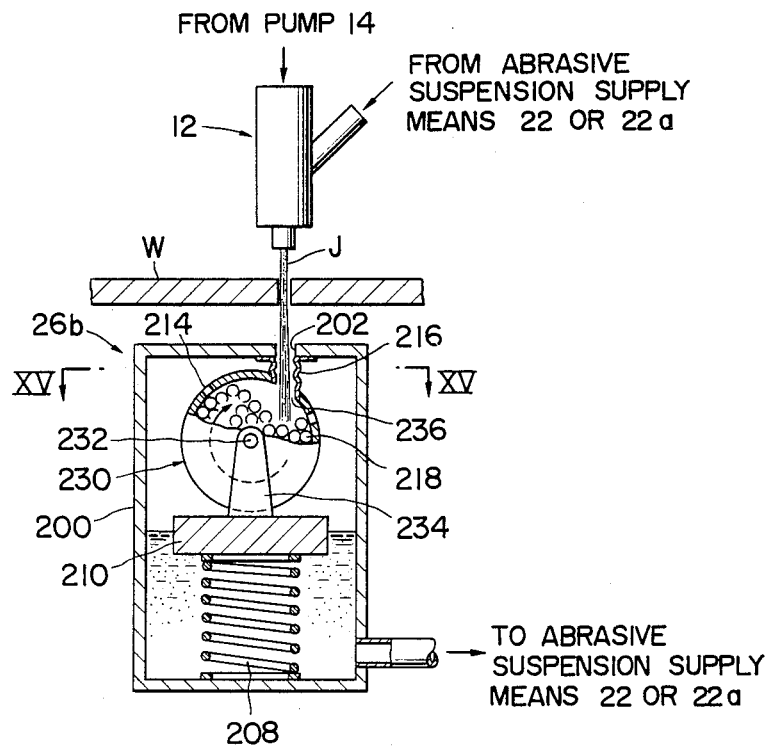
FIG. 14 is a vertical section through another preferred form of recovery vessel means for use in the apparatus of FIGS. 1 and 2, the recovery vessel means being shown together with the abrasive water jet nozzle assembly in the act of cutting sheet metal work with the abrasive water jet being recovered.
Figure 15:
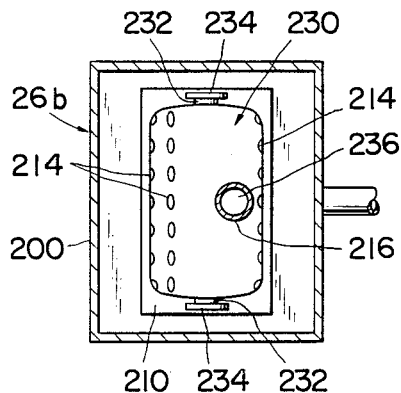
FIG. 15 is a horizontal section through the recovery vessel means of FIG. 14. taken along the line XV—XV therein.

The recovery vessel containing the damper balls need not be spherical in shape but can, for example, be cylindrical as in the second preferred form of recovery vessel means 26b shown in FIGS. 14 and 15. The cylindrical recovery vessel 230 is disposed horizontally and is mounted on the sprung mount 210 within the enclosure 200 by having its pair of trunnions 232 rotatably supported by a pair of fixed lugs 234 on the mount 210. However, the rotation of the recovery vessel 230 is limited to a prescribed angle by any suitable means which are not shown because of their commonplace nature.

An inlet opening 236 in the recovery vessel 230 is not in vertical alignment with the axis of the recovery vessel when the latter is in its normal angular position as in FIGS. 14 and 15 but is offset on one side of such a position of alignment with the recovery vessel axis. The bellows 216 extends between this inlet of the recovery vessel 230 and the inlet 202 of the enclosure 200. The recovery vessel means 26a can be identical in the other details of construction with the recovery vessel means 26a of FIG. 13.

Thus, by reason of the offset positioning of the inlet 236 on the cylindrical recovery vessel 230, the abrasive water jet J will cause some of the damper balls 218 to revolve about the axis of the recovery vessel, as indicated by the arrow in FIG. 14. Further, since the inlet 236 is disposed at a midpoint of the recovery vessel 230 with respect to its longitudinal dimension as in FIG. 15, the damper balls 218 will be forced apart toward the opposite axial ends of the recovery vessel. The recirculating damper balls will be successively exposed to the abrasive water jet J. Simultaneously, the abrasive water jet J will cause the oscillation of the recovery vessel 230 about its own axis and, furthermore, the deflection of the compression spring 208 with the consequent displacement of the recovery vessel. Such oscillation and displacement of the recovery vessel itself coact with the recirculation of the damper balls 218 within the vessel to attenuate the energy of the abrasive water jet J.

4-3. Third Form of Recovery Vessel Means

Figure 16:
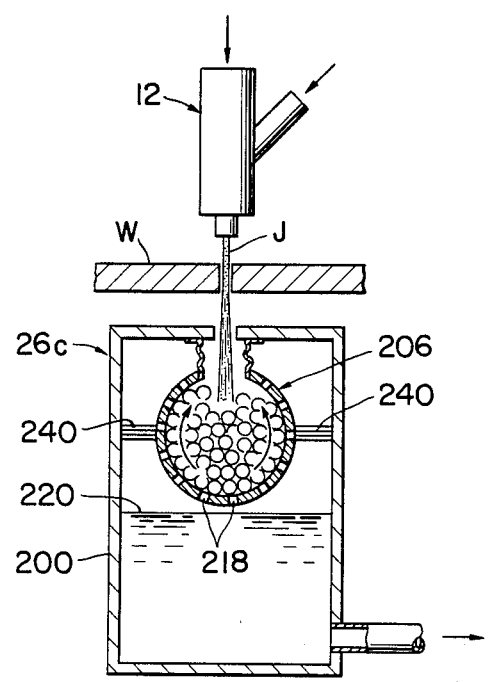
FIG. 16 is a view similar to FIG. 14 but showing a further alternative form of recovery vessel means.
Figure 17:
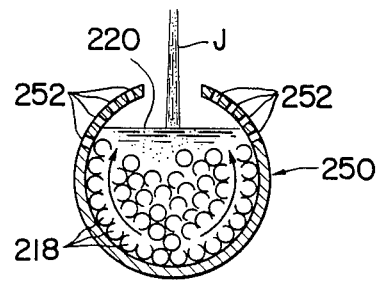
FIG. 17 is a vertical section through a modified recovery vessel for use in the recovery vessel means of FIG. 13 or 16.

FIG. 16 shows a third preferred form of recovery vessel means 26c which differs from the FIG. 13 recovery vessel means 26a in having cantilever spring means 240 in subtitution for the compression spring 208. Anchored to the enclosure 200, the cantilever spring means 240 resiliently support the recovery vessel 206 against the force of the incoming abrasive water jet J. This recovery vessel means 26c can be similar in the other details of construction to the recovery vessel means 26a. Its operation is also akin to that of the recovery vessel means 26a, with the cantilever spring means 240 functioning just like the compression spring 208. 4-4. Fourth Form of Recovery Vessel Means The recovery vessels 206 and 230 set forth in the foregoing preferred forms of recovery vessel means 26a, 26b and 26c are capable of modification as in a recovery vessel 250 shown in FIG. 17. The modified recovery vessel 250 has outlet openings 252 disposed only in its upper part, instead of all over the vessel as in the above disclosed recovery vessel means. This arrangement of the outlet openings 252 will result in the collection of the recovered fluid to such a level within the vessel 250 that, immersed in the fluid, the damper balls 218 will recirculate more smoothly within the vessel.

4-5. Fifth Form of Recovery Vessel Means

Figure 18:
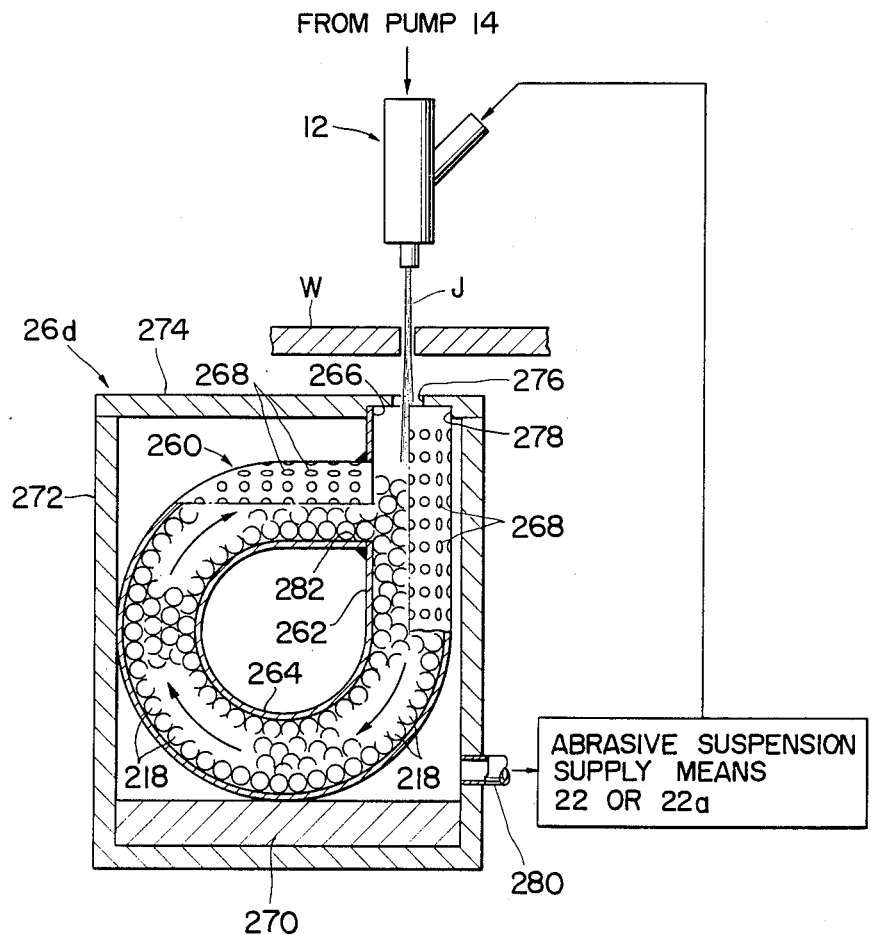
FIG. 18 is a view similar to FIG. 13 but showing a still further alternative form of recovery vessel means.

With reference to FIG. 18 a further preferred form of recovery vessel means 26d shown therein features a recovery vessel 260 which is made of metal tube formed into what might be described as a scroll shape. Designed to expedite the recirculation of the damper balls 218 filled therein, the recovery vessel 260 comprises a straight portion 262 and a curved position 264.

The straight portion 262 of the recovery vessel 260 extends vertically, or along an extension of the path of the abrasive water jet J from the nozzle assembly 12, and has an inlet opening 266 in its top end for the ingress of the abrasive water jet. The curved portion 264 may be thought of as joining the bottom end of the straight portion 262 back to the straight portion at a point intermediate the opposite extremities of the straight portion. The curved portion 264 is substantially arcuate, with the straight portion 262 extending along a tangent to the arc delineated by the curved portion. A multiplicity of outlet holes 268 are defined in an array over the entire surfaces of the recovery vessel 260.

The recovery vessel 260 rests on a rigid mount 270 of tungsten carbide or like material within a watertight, boxlike enclosure 272. The enclosure 272 has formed in its tip 274 a jet inlet 276 having a diameter slightly more than that of the abrasive water jet J. The jet inlet 276 has an enlargement 278 at its lower or inner end for closely receiving the entrance end portion of the recovery vessel 260 and hence for holding the vessel in position within the enclosure 272. The enclosure 272 has an outlet opening 280 adjacent its bottom for pumping out the recovered fluid to the abrasive suspension supply means 22 or 22a.

The size and number of the damper balls 218 within the recovery vessel 260 should be so determined as to permit their recirculation within the vessel in a manner to be explained hereafter. As in all the foregoing forms of recovery vessel means, the damper balls 218 may advantageously be fabricated from the same material as the abrasive particles used for abrasive water jet cutting.

In this scroll shaped recovery vessel 260 the damper balls 218 constantly recirculate through the substantially annular path, as indicated by the arrows in FIG. 18, to dissipate the energy of the incoming abrasive water jet J. The following is believed to be the most reasonable explanation of how the recirculation of the damper balls take place within the recovery vessel 260.

As the extremely slender jet J of abrasive water from the nozzle assembly 12 enters the recovery vessel 260 and strikes those damper balls 218 which lie centrally at or adjacent the vessel inlet 266, such balls will be forced downwardly. The downward displacement of these balls will urge some other damper balls radially outwardly and so will cause still other damper balls to travel up the inside surface of the recovery vessel 260 and then to fall under their own weight toward the cross sectional center of the tube of which the recovery vessel is made. Thus the damper balls 218 constantly undergo such displacement of axial symmetry within the straight portion 262 of the recovery vessel 260.

With such local displacement of the damper balls at and adjacent the vessel inlet 266, those ball which are received in the curved portion 264 of the recovery vessel 260 will successively fall from its exit end 282 into the straight portion 262. Therefore, the balls within the straight portion 262 will gradually move down, then into and up the curved portion 264, and finally back into the straight portion from the exit end 282 of the curved portion.

Thus, as in all the preferred forms of recovery vessel means disclosed previously, all the damper balls 218 within the recovery vessel 260 will be successively exposed to the impact of the incoming abrasive water jet J at and adjacent the vessel inlet 266 and so will wear at the same rate. Being free from any localized wear, the recirculating damper balls will have a much longer useful life than the known fixed damping means.

The recovery vessel 260 is susceptible to various modifications within the broad teaching of FIG. 18. For example, the radius of curvature of its curved portion 264 may be varied for smoother recirculation of the damper balls through the reduction of the friction exerted on the balls by the curved portion. Conversely, the recovery vessel may be so configured, or some such additional means may be employed, as to resist the recirculation of the damper balls. Also, as with the recovery vessel 250 of FIG. 17, one or more outlets may be formed only adjacent the jet inlet 266 of the recovery vessel 260 in order that the vessel may be filled with the recovered water. Such water will be effective to damp the energy of the water jet and to reduce the frictional wear of the damper balls.

An advantage common to all the preferred forms of recovery vessel means disclosed herein is the compactness of construction, realized through the fact that they bear the energy of the abrasive water jet at one point only. The last disclosed recovery vessel means 26d, for instance, can be as small as 150 millimeters in height. Therefore, in apparatus wherein work is cut by moving the nozzle assembly relative to the fixed work, the recovery vessel means may be moved with the nozzle assembly along the cutting line.

It will also be understood that the recovery vessel means of this invention need not be held in an upstanding attitude for receiving the abrasive water jet. Both the nozzle assembly and the recovery vessel means may be mounted on position control means such that the nozzle assembly can cut work by ejecting the abrasive water jet not only vertically downwardly but in any other direction.

What is claimed is:

1. An apparatus for cutting work by means of an abrasive water jet containing abrasive particles, comprising:
   (a) a source of water under pressure;
   (b) abrasive suspension supply means for supplying an abrasive suspension such that abrasive particles with an average size of up to about 100 microns are held in suspension in water;
   (c) an abrasive water jet nozzle assembly held opposite the work to be cut and communicating with both the pressurized water source and the abrasive suspension supply means, the nozzle assembly mixing the pressurized water and the abrasive suspension for directing the resulting mixture against the work as an abrasive water jet; and
   (d) recovery vessel means for recovering, for transfer back to the abrasive suspension supply means, the abrasive water jet which has been discharged from the abrasive water jet nozzle assembly and which has cut the work, the recovery vessel means comprising:
   (1) a recovery vessel positioned opposite the abrasive water jet nozzle assembly and having an inlet opening for admitting the abrasive water jet and at least one outlet opening for the discharge of the admitted water and abrasive particles;
   (2) a multiplicity of damper balls of rigid material within the recovery vessel for damping the energy of the abrasive water jet;
   (3) the recovery vessel having an inside surface which is at least partly rounded to allow the damper balls to be recirculated therein by the energy of the abrasive water jet;
(4) resilient means for resiliently supporting the recovery vessel;
(5) a watertight enclosure having mounted therein the recovery vessel and resilient means and having defined therein an inlet opening through which the abrasive water jet is admitted into the recovery vessel and an outlet opening in communication with the abrasive suspension supply means; and
(6) a bellows extending between the inlet opening in the watertight enclosure and the inlet opening in the recovery vessel.

2. An apparatus for cutting work by means of an abrasive water jet containing abrasive particles, said apparatus comprising:
(a) a source of water under pressure;
(b) abrasive suspension supply means for supplying an abrasive suspension such that abrasive particles with an average size of up to about 100 microns are held in suspension in water;
(c) an abrasive water jet nozzle assembly to be held opposite the work to be cut and communicating with both the pressurized water source and the abrasive suspension supply means, the nozzle assembly mixing the pressurized water and the abrasive suspension for directing the resulting mixture against the work as an abrasive water jet; and
(d) recovery vessel means for recovering and for transferring back to the abrasive suspension supply means the abrasive water jet which has been discharged from the abrasive water jet nozzle assembly and which has cut the work, the recovery vessel means comprising:
a spherical recovery vessel positioned opposite the abrasive water jet nozzle assembly and having an inlet opening for admitting the abrasive water jet and at least one outlet opening for the discharge of the admitted water and abrasive particles;
a multiplicity of damper balls of rigid material within the recovery vessel for damping the energy of the abrasive water jet; and
the recovery vessel having an inside surface rounded to allow the damper balls to be recirculated therein by the energy of the abrasive water jet.

3. An apparatus for cutting work by means of an abrasive water jet containing abrasive particles, said apparatus comprising:
(a) a source of water under pressure;
(b) abrasive suspension supply means for supplying an abrasive suspension such that abrasive particles with an average size of up to about 100 microns are held in suspension in water;
(c) an abrasive water jet nozzle assembly to be held opposite the work to be cut and communicating with both the pressurized water source and the abrasive suspension supply means, the nozzle assembly mixing the pressurized water and the abrasive suspension for directing the resulting mixture against the work as an abrasive water jet; and
(d) recovery vessel means for recovering and for transferring back to the abrasive suspension supply means the abrasive water jet which has been discharged from the abrasive water jet nozzle assembly and which has cut the work, the recovery vessel means comprising:
a recovery vessel positioned opposite the abrasive water jet nozzle assembly and having an inlet opening for admitting the abrasive water jet and at least one outlet opening for the discharge of the admitted water and abrasive particles;
a multiplicity of damper balls of rigid material within the recovery vessel for damping the energy of the abrasive water jet;
the recovery vessel having an inside surface which is at least partly rounded to allow the damper balls to be recirculated therein by the energy of the abrasive water jets; and
resilient means for resiliently supporting the recovery vessel.

* * * * *